(12) United States Patent
Fujita

(10) Patent No.: US 6,469,467 B1
(45) Date of Patent: *Oct. 22, 2002

(54) SERVO CONTROL APPARATUS AND METHOD OF STABILIZING SAME

(75) Inventor: Jun Fujita, Mishima (JP)

(73) Assignee: Toshiba Kikai Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/564,803

(22) Filed: May 5, 2000

(30) Foreign Application Priority Data

May 7, 1999 (JP) .......................... 11-127560

(51) Int. Cl.[7] .............................. G05B 19/416
(52) U.S. Cl. .................... 318/629; 318/568.18
(58) Field of Search ................ 318/569, 629, 318/632, 638, 568.18

(56) References Cited

U.S. PATENT DOCUMENTS

| | | | | |
|---|---|---|---|---|
| 4,980,625 A | * | 12/1990 | Shimada | 318/568.1 |
| 5,220,262 A | * | 6/1993 | Kneifel, II et al. | 318/569 |
| 5,313,549 A | * | 5/1994 | Ovaska | 388/814 |
| 5,404,418 A | * | 4/1995 | Nagano | 388/806 |
| 5,525,877 A | * | 6/1996 | Umida | 318/432 |
| 5,646,495 A | * | 7/1997 | Toyozawa et al. | 318/625 |
| 5,773,938 A | * | 6/1998 | Seong et al. | 318/6 |
| 6,107,771 A | * | 8/2000 | Maeda | 318/630 |
| 6,246,536 B1 | * | 6/2001 | Galloway | 360/78.04 |
| 6,274,994 B2 | * | 8/2001 | Tsutsui | 318/560 |
| 6,274,995 B1 | * | 8/2001 | Kerner | 318/611 |

OTHER PUBLICATIONS

Applications for Piezo–actuators (pp. 1–2); Advantages of Piezoelectric Positioning Systems (p. 1); Basic Designs of Piezoelectric Positioning Elements (p. 1).*
Servomotor (p. 1) and DC servo Motors (p. 1).*

* cited by examiner

Primary Examiner—Robert E. Nappi
Assistant Examiner—Rina I. Duda
(74) Attorney, Agent, or Firm—Finnegan, Henderson, Farabow, Garrett & Dunner, L.L.P.

(57) ABSTRACT

In a servo control apparatus including a speed controller (35) for controlling a servo motor so a difference between a speed command value and a speed feedback value becomes a zero, a filter (41) having characteristics that are reverses of, or approximate the reverses of, at least one set of anti-resonance and resonance characteristics of a control object is built in the speed controller (35).

4 Claims, 5 Drawing Sheets

($\omega_1=213, \omega_2=230.6, \zeta_1=0.002, \zeta_2=0$)

($\omega c=100$, $\omega b=1200$)

($\omega c=400$, $\omega b=1200$)

($\omega c=400$, $\omega b=400$)

SERVO CONTROL APPARATUS AND METHOD OF STABILIZING SAME

BACKGROUND OF THE INVENTION

1. Field of the Invention

The present invention relates to a servo control apparatus and to a method of stabilizing a servo control apparatus. More particularly, the invention relates to a servo control apparatus and a method of stabilizing a servo control apparatus for a feed drive system, such as in a machine tool, industrial machinery or robot.

2. Description of the Related Art

Feed drive systems using servo control, such as in machine tools, industrial machinery, or robots, generally include a speed loop which has a position loop as its main loop, and by which a speed controller of a servomotor is controlled so that the difference or deviation between a speed command value and a fed-back speed value becomes a zero.

FIG. 5 is a Bode diagram of speed control of a feed drive system for a machine tool. The Bode diagram plots a gain and a phase of the system for a range of frequency. In FIG. 5, there appear resonance and anti-resonance pairs near 100 Hz and 400 Hz, respectively. FIG. 4 is a Bode diagram for a speed control proportional gain $\omega c=100$ rad/s and a first-degree delay filter cutoff frequency $\omega b=1200$ rad/s. There is near 100 Hz an anti-resonance due to an axial rigidity of an associated feed drive mechanism, and near 400 Hz an anti-resonance due to a torsional rigidity of an associated ball screw.

In the above-described speed control system, if the gain is increased in order to improve response, there are cases in which instability occurs near a resonance peak frequency. For example, if the speed control proportional gain is increased from 100 rad/s to 400 rad/s, there occurs such a condition as illustrated in FIG. 6. In FIG. 6, resonance peaks near 100 Hz and 400 Hz both exceed 0 dB. However, near 400 Hz, the phase crosses 180°, and makes the servo system unstable.

For prevention of this condition, one approach that can be envisioned is that of using a low pass filter to reduce gains at the resonance peaks. The low pass filter is built in the speed controller, usually as a first-degree delay filter. By lowering the cutoff frequency of the first-degree delay filter, the gain can be reduced in a high frequency region. FIG. 7 is a Bode diagram for a case in which, by having an increased speed control proportional gain, the cutoff frequency is reduced from 1200 rad/s to 400 rad/s. In this case, although the resonance peak near 400 Hz is lowered below 0 dB, there is a reduction in phase margin near 100 Hz. This also leads to a tendency to instability of the servo system.

Another approach that can be taken is that of using a band stop filter to suppress the gain of resonance peak. This approach is illustrated in FIG. 8 to FIG. 10. FIG. 8 shows a characteristic of a control object (for the case having resonance and anti-resonance pairs at 100 Hz and 250 Hz, respectively), FIG. 9 shows a characteristic of a band stop filter, and FIG. 10 shows a synthesized characteristic in which the characteristics of the control object and the band stop filter are combined. In this case also, although the gain of resonance peak at the high-frequency side is suppressed so as to achieve stability, there is an accompanied increase in phase delay at the low-frequency side, with a tendency to go unstable near 142 Hz in the figure.

SUMMARY OF THE INVENTION

The present invention is made with such points in view. Accordingly, it is an object of the present invention to provide a servo control apparatus and a method of stabilizing a servo control apparatus, which enables the gain of a speed control system to be increased by suppressing the gain of a resonance peak to be stable, while possibly suppressing the increase of a phase delay in a low-frequency region.

A first aspect of the present invention to achieve the object is a servo control apparatus including a speed controller for controlling a servo motor so that a difference between a speed command signal and a speed feedback signal becomes a zero, wherein the speed controller has built therein a filter having characteristic that are reverses, or approximate the reverses, of at least one set of anti-resonance and resonance characteristics of a control object.

According to a second aspect of the present invention, the filter is an infinite impulse response filter having parameters to be set in accordance with anti-resonance and resonance frequencies and anti-resonance and resonance amplitudes.

According to a third aspect of the present invention, the servo control apparatus is used in a feed drive system of one of a machine tool, a piece of industrial machinery, and a robot.

A fourth aspect of the present invention to achieve the object is a method of stabilizing a servo control apparatus including a speed controller for controlling a servo motor so that a difference between a speed command signal and a speed feedback signal becomes a zero, wherein the method comprises the steps of having a filter built in the speed controller, and adjusting characteristics of the filter so as to cancel at least one set of anti-resonance and resonance characteristics of a control object.

According to a fifth aspect of the present invention, the method of stabilizing a servo control apparatus includes the steps of using as the filter an indefinite impulse filter, and setting parameters of the filter in accordance with anti-resonance and resonance frequencies and anti-resonance and resonance amplitudes.

BRIEF DESCRIPTION OF THE DRAWINGS

The above and further objects and novel features of the present invention will more fully appear from the following detailed description when the same is read in conjunction with the accompanying drawings, in which.

DESCRIPTION OF THE PREFERRED EMBODIMENTS

Embodiments of the present invention are described in detail below, with reference to relevant accompanying drawings.

Figure 1:
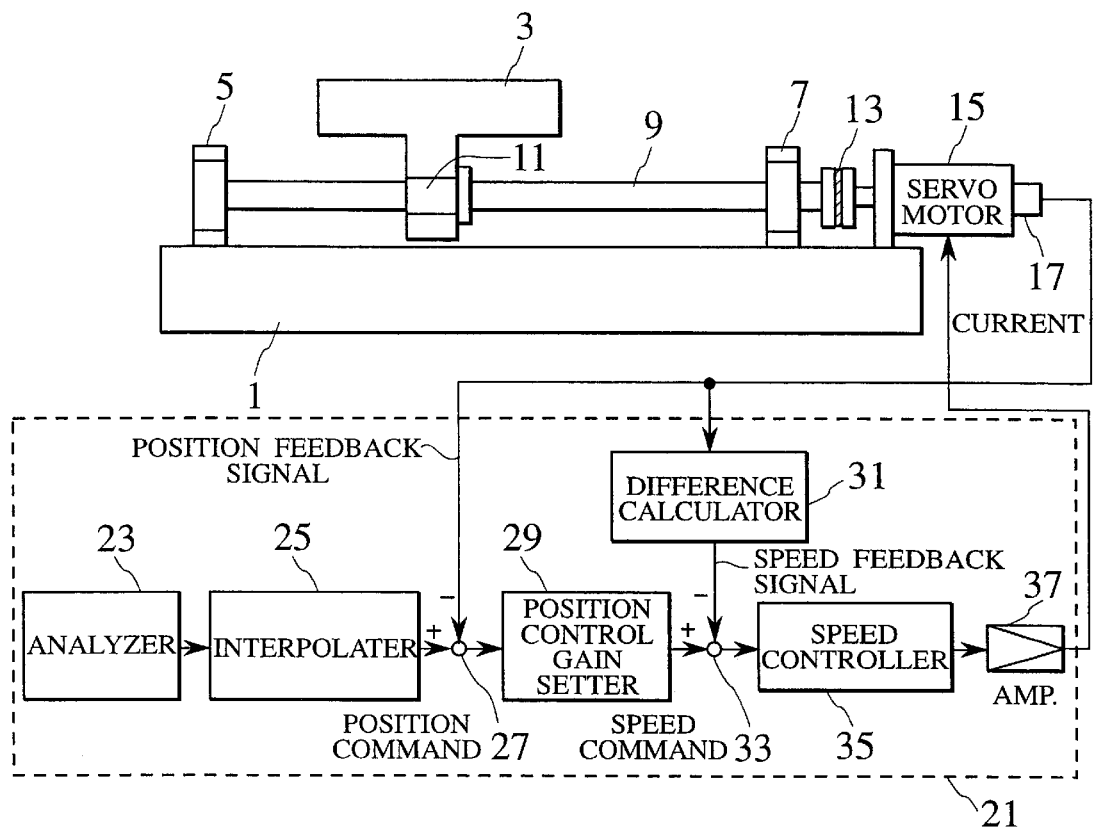
FIG. 1 shows a configuration, partly in block diagram, of a servo control apparatus according to an embodiment of the present invention applied to a feed drive system of a machine tool.

FIG. 1 shows a servo control apparatus according to an embodiment of the present invention applied to a feed drive system of a machine tool. In FIG. 1, reference numerals 1 and 3 denote a bed and an associated table, respectively. The bed 1 is provided with a pair of brackets 5 and 7, by which a ball screw 9 is rotatably supported. The table 3 is mounted with a ball screw nut 11, which is screwed on the ball screw 9. The table 3 is moved in an axial direction of the ball screw 9, as the ball screw 9 rotates.

For driving, the ball screw 9 is connected by a coupling 13 to a servo motor 15. The servo motor 15, which has a rotary encoder 17, is feedback controlled by a numerical control apparatus 21.

The numerical control apparatus 21 has: a machining program analyzer 23 for performing numerical control; an interpolator 25 for performing interpolation calculations; a position difference calculator 27 for calculating a positional difference between a position command given from the interpolator 25 and a position feedback signal from the rotary encoder 17; a position control gain setter 29 for setting a gain for the positional difference to output a speed command; a difference calculator 31 for performing a difference (differential) calculation of the position feedback signal from the rotary encoder 17 to obtain a speed feedback signal; a speed difference calculator 33 for calculating a speed difference between the speed command and the speed feedback signal; and a speed controller 35 for outputting a current command based on the speed difference, to an amplifier 37 for the servo motor 13.

Figure 2:
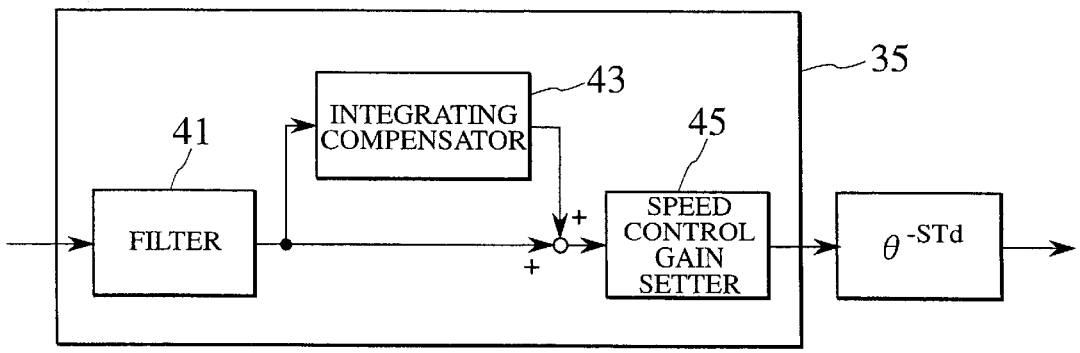
FIG. 2 is a block diagram of a speed controller of the servo control apparatus according to the present invention.

As shown in FIG. 2, the speed controller 35 has a filter 41, an integrating compensator 43, and a speed control gain setter 45. In FIG. 2, reference character Td denotes a dead time, and s denotes a Laplacian operator.

The filter 41 is an infinite impulse response (IIR) filter which is adapted, by parameter setting, to operate as a filter having characteristics that are reverses of, or approximate the reverses of, at least one set of resonance and anti-resonance characteristics of an associated control object.

The filter 41 is adjusted to have characteristics as shown by expression (1).

$$G_f(s) = \omega_1^2(s^2 + 2\xi_2\omega_2 s + \omega_2^2)/\omega_2^2(s^2 + 2\xi_1\omega_1 s + \omega_1^2) \quad (1),$$

where $\xi_1$, $\xi_2$, $\omega_1$, and $\omega_2$ are parameters to be set respectively. Parameter $\omega_1$ is set as a value close to an anti-resonance (angular) frequency, and parameter $\omega_2$ is set as a value close to a resonance (angular) frequency. Parameters $\xi_1$ and $\xi_2$ are set in response to amplitudes of peaks of anti-resonance and resonance, respectively, and are preferably made small.

Figure 3:
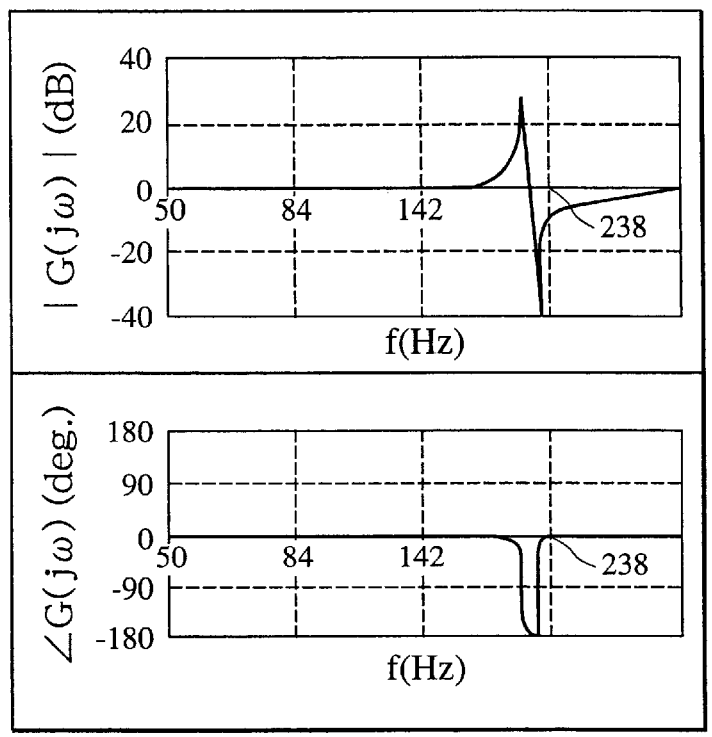
FIG. 3 is a graph of filter characteristic curves showing characteristics of a filter built in the speed controller of the servo control apparatus according to the present invention.
Figure 4:
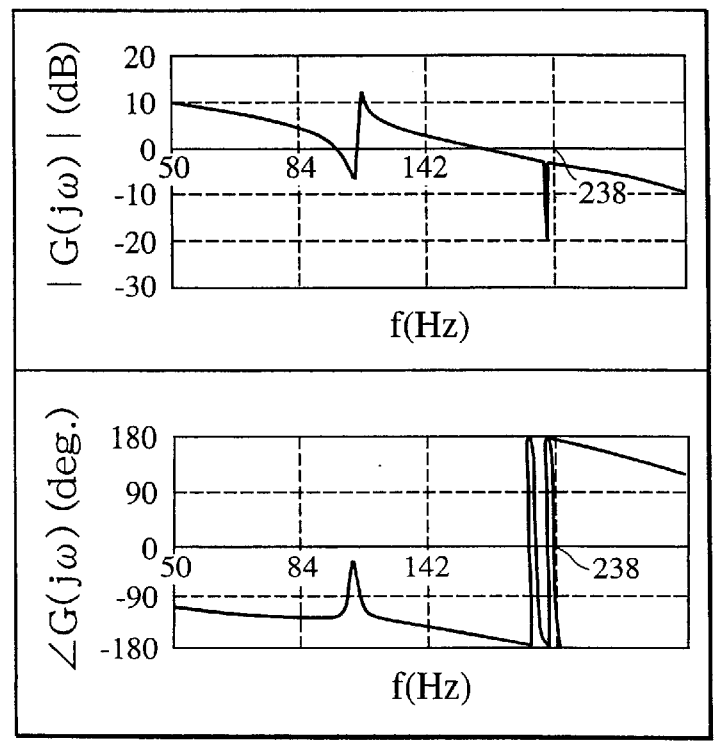
FIG. 4 is a Bode diagram showing characteristics of a control object servo controlled by the servo control apparatus according to the present invention.
Figure 5:
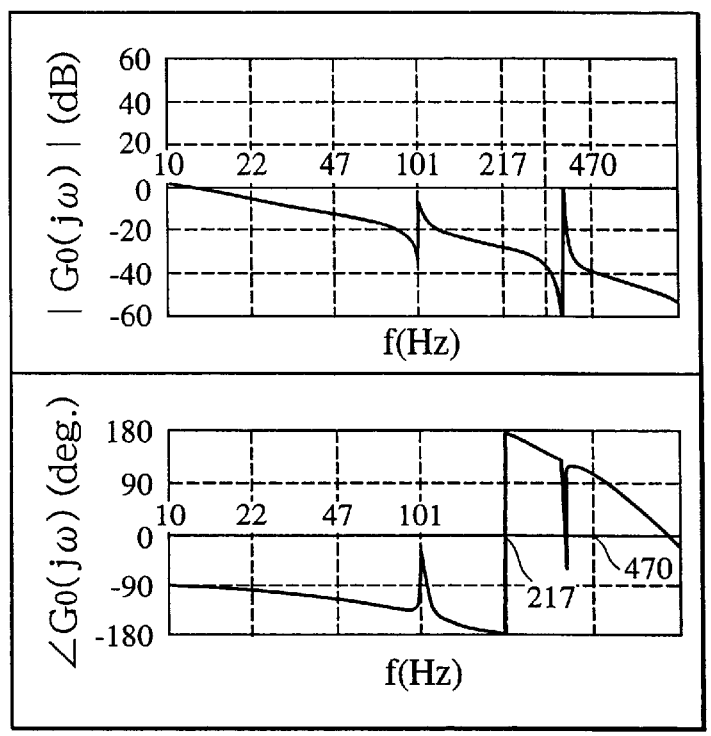
FIG. 5 is a Bode diagram of an open-loop speed control system of a machine tool.
Figure 6:
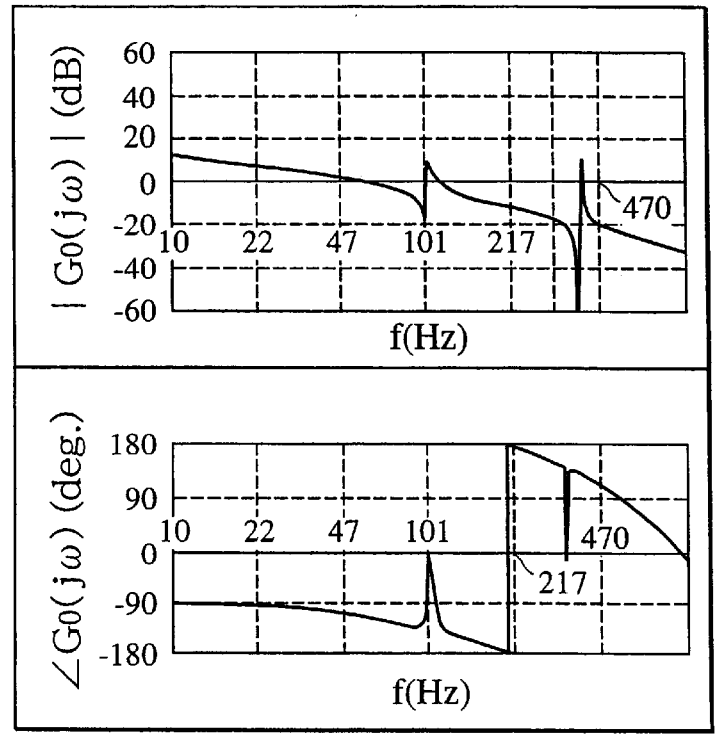
FIG. 6 is a Bode diagram in a case in which a speed control proportional gain is increased.
Figure 7:
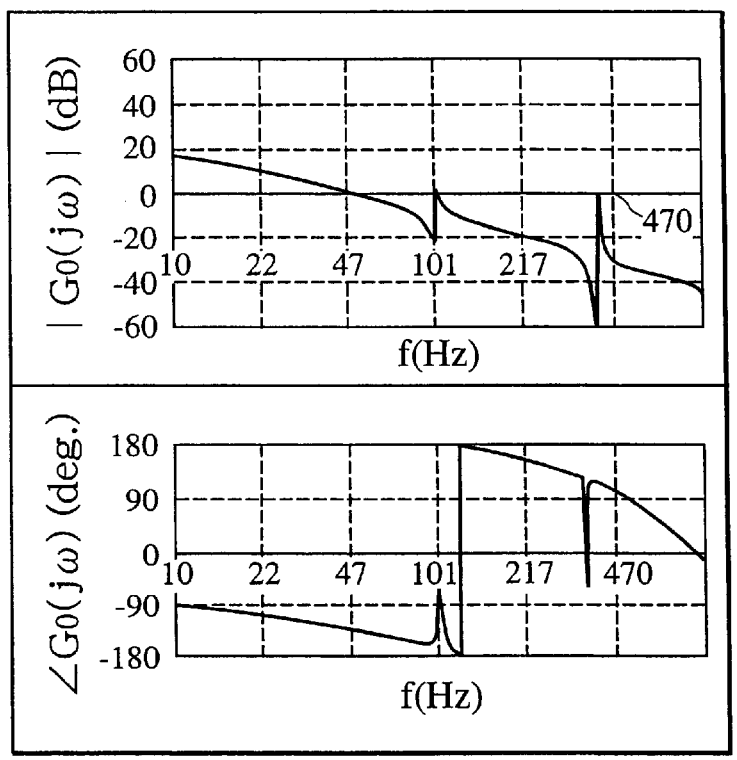
FIG. 7 is a Bode diagram in a case in which a cutoff frequency of a first-degree delay filter is decreased.
Figure 8:
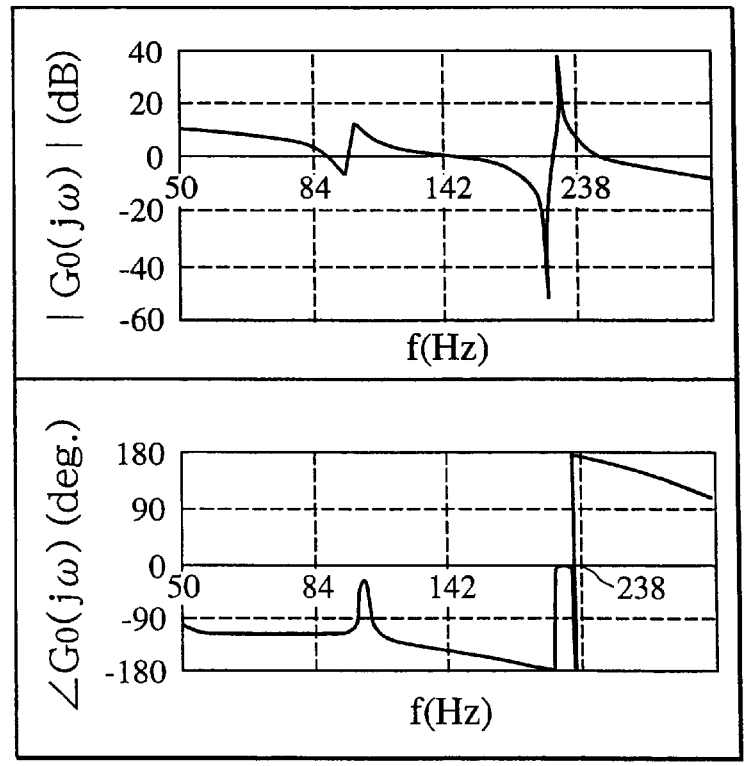
FIG. 8 is a Bode diagram showing characteristics of a control object having anti-resonance and resonance pairs near 100 Hz and 250 Hz.
Figure 9:
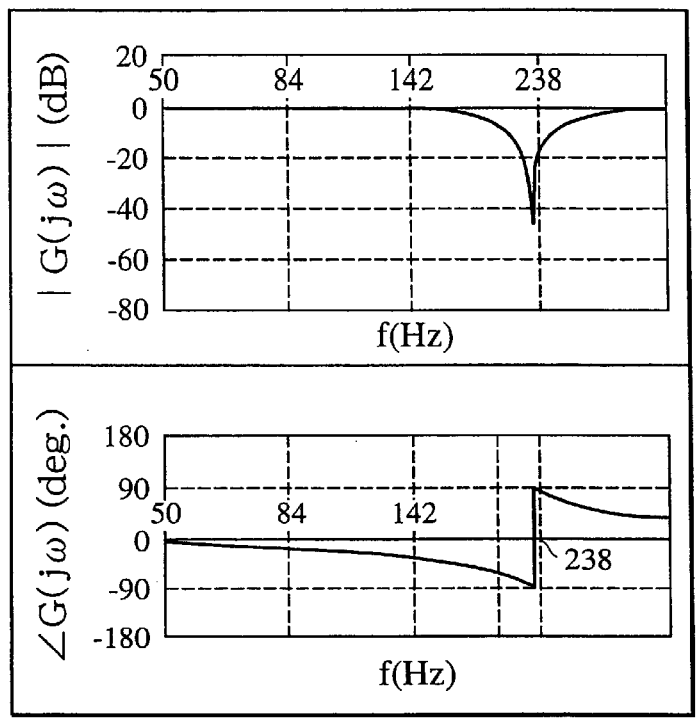
FIG. 9 is a Bode diagram showing characteristics of a band stop filter.
Figure 10:
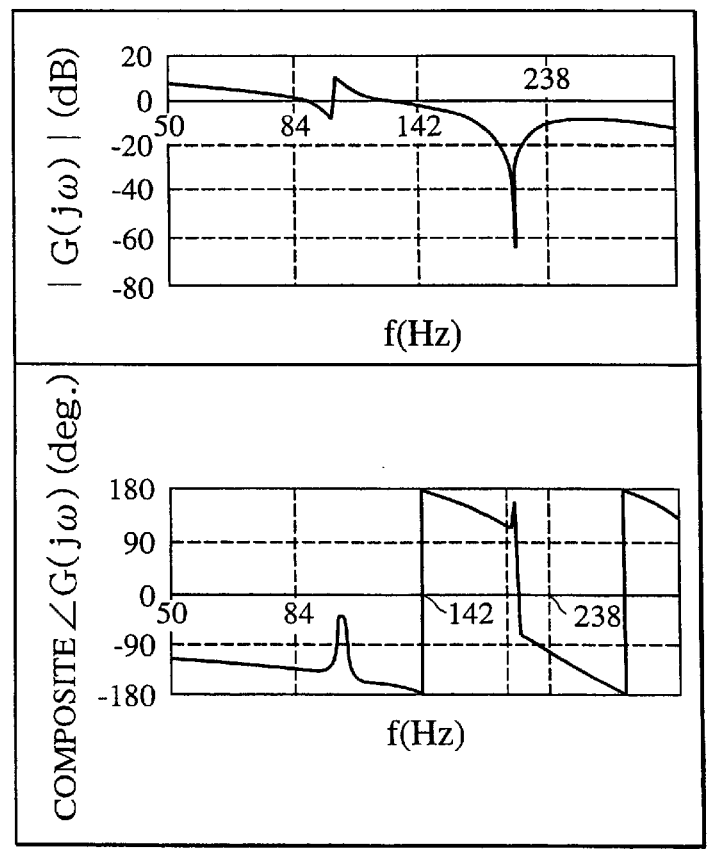
FIG. 10 is a Bode diagram showing a synthesis of the characteristics of the control object and the band stop filter.

For correction of such characteristics of a control object as shown in FIG. 8, the parameters are set to be: $\omega_1=213.0$, $\omega_2=230.6$, $\xi_1=0.002$, and $\xi_2=0$. With these parameter settings, the filter has such characteristics as shown in FIG. 3, which are combined with characteristics of the control object shown in FIG. 8 to obtain such a result as shown in FIG. 4.

From this figure, it can be seen that anti-resonance and resonance characteristics of the control object are cancelled out, that a resonance peak at high-frequency side is suppressed, and also that almost no change is found in phase delay in low-frequency region.

It therefore is possible to suppress the gain at a resonance peak while possibly minimizing the increase in phase delay in low-frequency region, and to stabilize the speed control system to raise its gain, so that, in a machine tool or the like, the feed drive system can have an increased speed and accuracy.

A servo control apparatus according to the present invention is applicable also to a feed drive system for such industrial equipment as a robot or an injection molding apparatus, as well as for the machine tool.

As is apparent from the foregoing description, because a servo control apparatus according to the present invention has, in a speed controller thereof, a built-in filter of characteristics that are reverses of, or approximate the reverses of, at least one set of anti-resonance and resonance characteristics of a control object, it can achieve stable servo control by suppressing the gain at an unstable resonance peak, to have an increased gain so that the servo control characteristics can be improved, as well as for improvements in performances of such industrial equipment as machine tools, robots, and injection molding apparatuses.

According to a method of stabilizing a servo control apparatus according to the present invention, because characteristics of a filter built in a speed controller are adjusted so as to cancel out at least one set of anti-resonance and resonance characteristics of a control object, the gain at an unstable resonance peak can be suppressed, and the servo control can be stabilized to have an increased gain to achieve improvements of servo control characteristic, as well as in performances of machine tools, robots, injection molding machines and other industrial machines.

While preferred embodiments of the invention have been described using specific terms, such description is for illustrative purposes, and it is to be understood that changes and variations may be made without departing from the spirit or scope of the following claims.

What is claimed is:

1. A servo control apparatus including a speed controller for controlling a servo motor so that a difference between a speed command signal and a speed feedback signal becomes a zero, wherein the speed controller has an infinite impulse response filter with characteristics adjusted in accordance with:

$$G_f(s) = \omega_1^2(s^2 + 2\xi_2\omega_2 s + \omega_2^2)/\omega_2^2(s^2 + 2\xi_1\omega_1 s + \omega_1^2)$$

wherein $\omega_1$, and $\omega_2$ are values close to the anti-resonance and the resonance frequencies, respectively, and $\xi_1$ and $\xi_2$ are set in response to anti-resonance and resonance peak amplitudes, respectively.

2. A servo control apparatus according to claim 1, wherein the servo control apparatus is used in a feed drive system of one of a machine tool, a piece of industrial machinery, and a robot.

3. A method of stabilizing a servo control apparatus including a speed controller for controlling a servo motor so that a difference between a speed command signal and a speed feedback signal becomes a zero, wherein the method comprises the steps of having an infinite impulse filter built in the speed controller, and adjusting characteristics of the filter in accordance with:

$$G_f(s) = \omega_1^2(s^2 + 2\xi_2\omega_2 s + \omega_2^2)/\omega_2^2(s^2 + 2\xi_1\omega_1 s + \omega_1^2);$$

wherein $\omega_1$ and $\omega_2$ are values close to the anti-resonance and the resonance frequencies, respectively, and $\xi_1$ and $\xi_2$ are set in response to anti-resonance and resonance peak amplitudes, respectively.

4. The method of claim 3, wherein the servo control apparatus is used in a feed drive system of one of a machine tool, a piece of industrial machinery, and a robot.

* * * * *